US012808229B2

(12) United States Patent
Townsend et al.

(10) Patent No.: US 12,808,229 B2
(45) **Date of Patent: *Nov. 24, 2026**

(54) PORTABLE LOCK APPARATUS

(71) Applicant: Schlage Lock Company LLC, Carmel, IN (US)

(72) Inventors: Robert Townsend, Jamaica Plain, MA (US); Arjun S. Kunnath, Kottayam (IN); Ramamohan Bhaskar Shettigar, Thane (IN); Manjunatha Ramakrishna, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/767,651

(22) Filed: Jul. 9, 2024

(65) Prior Publication Data

US 2024/0360696 A1 Oct. 31, 2024

Related U.S. Application Data

(63) Continuation of application No. 17/373,098, filed on Jul. 12, 2021, now Pat. No. 12,031,353.

(51) Int. Cl.
*E05B 37/02* (2006.01)
*E05B 67/06* (2006.01)

(52) U.S. Cl.
CPC .......... *E05B 37/025* (2013.01); *E05B 67/063* (2013.01)

(58) Field of Classification Search
CPC ........ E05B 37/025; E05B 37/10; E05B 67/06; E05B 67/063
See application file for complete search history.

(56) References Cited

U.S. PATENT DOCUMENTS 1,411,123 A * 3/1922 Nadolny ............... E05B 37/025 70/25
4,887,441 A * 12/1989 Ling ..................... E05B 37/025 70/25

(Continued)

FOREIGN PATENT DOCUMENTS

CN 206245898 U 6/2017
DE 4322989 A1 1/1995

(Continued)

OTHER PUBLICATIONS

Extended European Search Report; European Patent Office; European Patent Application No. 22842753.0; Jul. 7, 2025; 11 pages.

(Continued)

*Primary Examiner* — Christopher J Boswell
(74) *Attorney, Agent, or Firm* — Taft Stettinius & Hollister LLP

(57) ABSTRACT

An exemplary lock apparatus generally includes a shackle, a crossbar, a lock device, a first bolt, and a trigger. The lock device has a locked state in which the lock device retains a spindle in a spindle locking position, and an unlocked state in which the lock device does not prevent movement of the spindle to a spindle unlocking position. The first bolt is engaged with the spindle such that movement of the spindle between the spindle locking position and the spindle unlocking position drives the first bolt between a first locking position and a first unlocking position. The trigger is movably mounted in the crossbar for movement between an engagement position, in which the trigger maintains the spindle in the spindle unlocking position, and a disengagement position, in which the spindle is operable to move to the spindle locking position.

19 Claims, 12 Drawing Sheets

(56) References Cited

U.S. PATENT DOCUMENTS

| | | | | |
|---|---|---|---|---|
| 5,005,384 | A * | 4/1991 | Lo | E05B 37/025 70/25 |
| 5,142,888 | A | 9/1992 | Ling | |
| 5,406,811 | A | 4/1995 | Nakai | |
| 5,787,736 | A | 8/1998 | Ling | |
| 5,791,169 | A | 8/1998 | Kuo | |
| 5,850,751 | A | 12/1998 | Kuo | |
| 5,924,313 | A | 7/1999 | Kuo | |
| 6,799,446 | B1 * | 10/2004 | Tsai | E05B 37/02 70/306 |
| 6,880,371 | B2 | 4/2005 | Huang | |
| 7,254,971 | B2 | 8/2007 | Ruan | |
| 7,389,659 | B1 | 6/2008 | Diaz et al. | |
| 9,495,820 | B1 * | 11/2016 | Li | E05B 47/06 |
| 10,392,835 | B2 | 8/2019 | Ramakrishna et al. | |
| 12,031,353 | B2 * | 7/2024 | Townsend | E05B 67/063 |
| 2007/0234765 | A1 * | 10/2007 | Tsai | E05B 37/025 70/30 |
| 2019/0010728 | A1 | 1/2019 | Ramakrishna et al. | |
| 2023/0008382 | A1 | 1/2023 | Townsend et al. | |
| 2024/0384563 | A1 * | 11/2024 | Ramakrishna | E05B 17/2092 |

FOREIGN PATENT DOCUMENTS

| | | | |
|---|---|---|---|
| DE | 10228039 | A1 | 3/2003 |
| EP | 3567193 | A1 | 11/2019 |
| WO | 2020033954 | A1 | 2/2020 |

OTHER PUBLICATIONS

ToolChimp; Squire Hammerhead Combi 230—Hammerhead Combination D Lock 230 mm, Bike D Locks; www.squirepadlocks.co.uk; 4 pages; Copyright 2021 ToolChimp.

ABUS; Ultra Combo 410/170HB230 black SH34; 3 pages; Copyright ABUS Mar. 2021.

Ming Tay Hardware Inc. Co., Ltd.; MT-649 High Security Resettable Combination; www.mingtay.com.tw/index.php?mod=products/index/cat_id/4/pageID/2; 1 page.

Ridepanda; Combo STD; 4 pages; https://www.ridepanda.com/accessories/combo-std/?utm_source=google&utm_medium=pla&utm_campaign=combo-std&gclid=Cj0KCQjw0K-HBhDDA.

International Search Report; International Searching Authority; International Application No. PCT/US2022/036809; Feb. 17, 2023; 2 pages.

Written Opinion of the International Searching Authority; International Searching Authority; International Application No. PCT/US2022/036809; Feb. 17, 2023; 7 pages.

Supplemental European Search Report; European Patent Office; European Patent Application No. 22842753.0; Apr. 15, 2025; 13 pages.

Examination Report; Canadian Intellectual Property Office; Canadian Patent Application No. 3,225,791; Jun. 12, 2025; 8 pages.

* cited by examiner

PORTABLE LOCK APPARATUS

TECHNICAL FIELD

This application is a continuation of U.S. patent application Ser. No. 17/373,098 filed Jul. 12, 2021 and issued as U.S. Pat. No. 12,031,353, the contents of which are incorporated herein by reference in their entirety.

TECHNICAL FIELD

The present disclosure generally relates to portable lock apparatuses, and more particularly but not exclusively relates to combination U-locks.

BACKGROUND

Portable lock apparatuses are often used to deter theft of portable objects, such as bicycles. Such portable locks typically include a body and a shackle operable to surround a portion of the portable object and a portion of a stationary object. At least a portion of the shackle is selectively secured to the body to form a hoop surrounding the portion of the portable object and the portion of the stationary object to thereby lock the portable object to the stationary object. Certain existing portable lock apparatuses suffer from one or more drawbacks or limitations, such as those relating to ease of use, security, and strength. While some existing portable lock apparatuses utilize dial-based combination lock devices, such combination locks present unique difficulties, such as those relating to ease of changing the combination and deterrence of tampering events such as picking. For these reasons among others, there remains a need for further improvements in this technological field.

SUMMARY

An exemplary lock apparatus generally includes a shackle, a crossbar, a lock device, a first bolt, and a trigger. The lock device has a locked state in which the lock device retains a spindle in a spindle locking position, and an unlocked state in which the lock device does not prevent movement of the spindle to a spindle unlocking position. The first bolt is engaged with the spindle such that movement of the spindle between the spindle locking position and the spindle unlocking position drives the first bolt between a first locking position and a first unlocking position. The trigger is movably mounted in the crossbar for movement between an engagement position, in which the trigger maintains the spindle in the spindle unlocking position, and a disengagement position, in which the spindle is operable to move to the spindle locking position. Further embodiments, forms, features, and aspects of the present application shall become apparent from the description and figures provided herewith.

DETAILED DESCRIPTION OF ILLUSTRATIVE EMBODIMENTS

Figure 1:
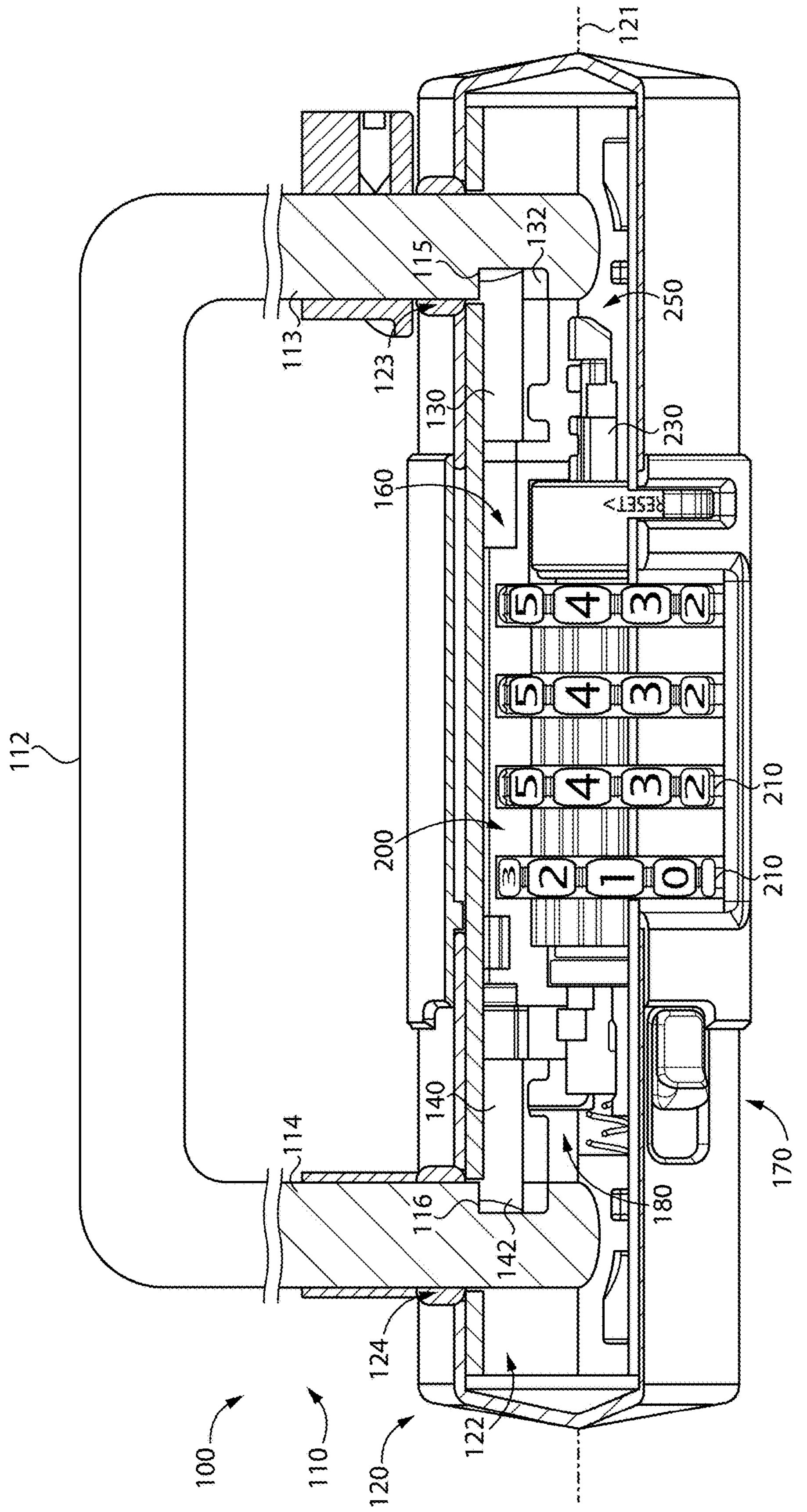
FIG. 1 is a partial cutaway view of a lock apparatus according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a portable lock apparatus 100 according to certain embodiments. The lock apparatus 100 generally includes a shackle 110 and a crossbar 120 operable to selectively prevent removal of at least a portion of the shackle 110 therefrom. Disposed within the crossbar 120 are a first bolt 130, a second bolt 140, a trigger 150 operable to selectively retain the bolts 130, 140 in unlocking positions, a lock device 200 operable to selectively retain the bolts 130, 140 in locking positions, a reset mechanism 160 operable to transition the lock device 200 between an operating mode and a reset mode, a slider 170 selectively operable to move the bolts 130, 140 between the locking and unlocking positions thereof, and a movement reverser 180 configured to cause the first bolt 130 and the second bolt 140 to move in opposite directions. The lock device 200 generally includes a plurality of outer dials 210, a plurality of inner dials 220 selectively engaged with the plurality of outer dials 210, and a spindle 230 that extends through the inner dials 220. As described herein, the spindle 230 is engaged with the slider 170 and each of the bolts 130, 140 such that the slider 170 is operable to drive the bolts 130, 140 from locking positions to unlocking positions when the lock device 200 is in its unlocked state.

The shackle 110 generally includes a connecting portion 112, a first foot 113 extending from a first side of the connecting portion 112, and a second foot 114 extending from a second side of the connecting portion 112. In the illustrated form, the shackle 110 is rigid and generally U-shaped. In other embodiments, the shackle 110 may be flexible and/or have another geometry. In the illustrated form, the first foot 113 and the second foot 114 are parallel to one another. In other embodiments, one of the first foot 113 or the second foot 114 may extend at an oblique angle relative to the other of the first foot 113 or the second foot 114. The first foot 113 defines a first notch 115 operable to engage the first bolt 130, and the second foot 114 defines a second notch 116 operable to engage the second bolt 140.

As described herein, the illustrated shackle 110 is operable to be completely removed from the crossbar 120. In other embodiments, one end of the shackle 110 may be coupled to the crossbar 120. For example, if the shackle 110 is provided in a flexible form (e.g., as a cable or chain), one end of the flexible shackle may be coupled to the crossbar 120 while the other end of the flexible shackle defines a foot that is removable from the crossbar 120. As another example, in embodiments in which the shackle 110 is rigid, one foot 112/114 of the shackle 110 may be hingedly coupled with the crossbar 120 while the other foot 112/114 is operable to selectively couple with the crossbar 120.

The crossbar 120 extends along a central longitudinal axis 121 that defines a proximal direction (to the left in FIG. 1) and an opposite distal direction (to the right in FIG. 1). The crossbar 120 defines an internal chamber 122 in which various components of the lock apparatus 100 are seated, and in the illustrated form further defines a first opening 123 operable to receive the first foot 113 and a second opening 124 operable to receive the second foot 114. In certain forms, the crossbar 120 may be considered to include one or more other components of the lock apparatus 100, such as the first bolt 130, the second bolt 140, the trigger 150, the reset mechanism 160, the slider 170, the movement reverser 180, and/or the lock device 200. It is also contemplated that such components may be considered to be mounted to the crossbar 120.

Figure 2:
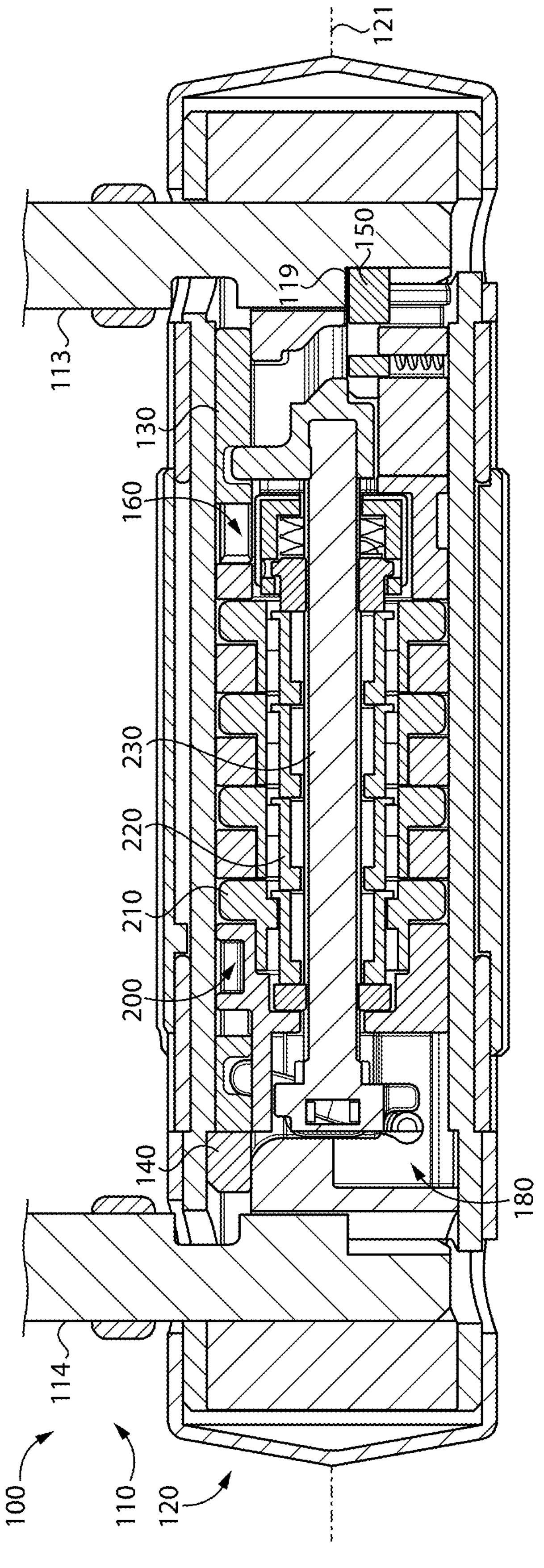
FIG. 2 is a cross-sectional view of the lock apparatus illustrated in FIG. 1 in a coupled-unlocked state.
Figure 3:
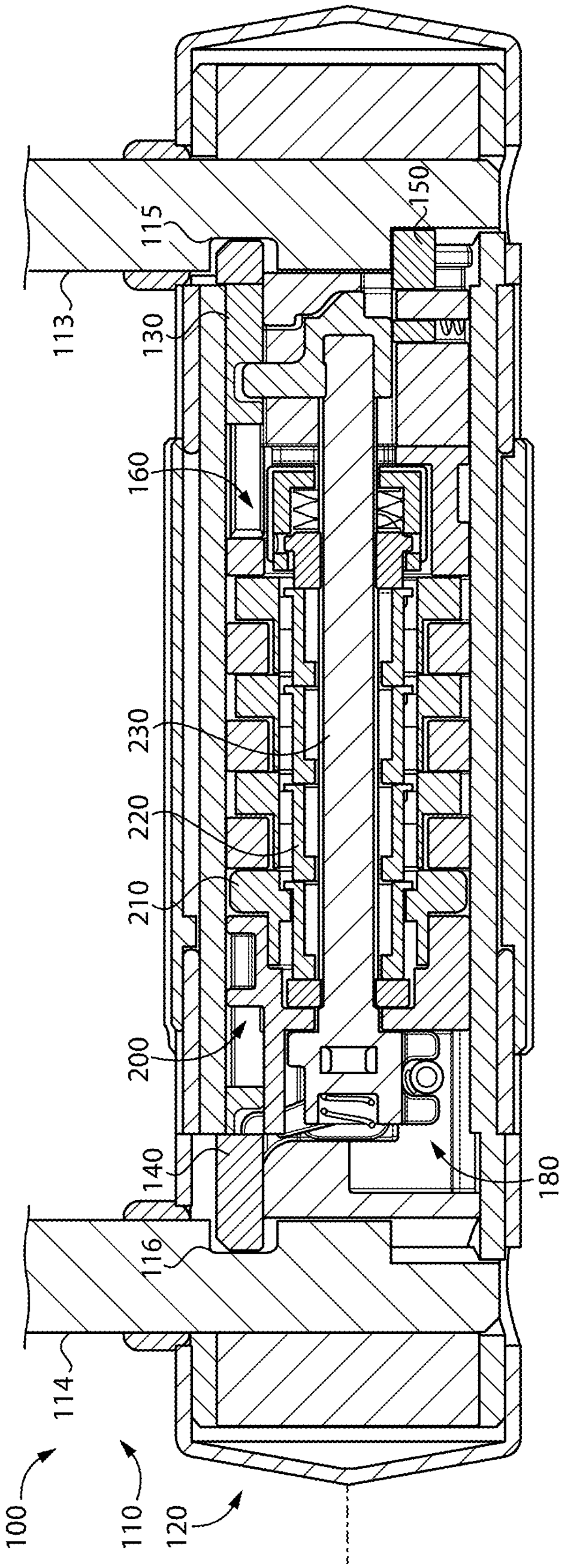
FIG. 3 is a cross-sectional view of the lock apparatus illustrated in FIG. 1 in a coupled-locked state.

With additional reference to FIGS. 2 and 3, the first bolt 130 is movably mounted in the chamber 122 for movement between a first unlocking position (FIG. 2) and a first locking position (FIG. 3). In the illustrated embodiment, the first unlocking position is a proximal position and the first locking position is a distal position. In the first unlocking position, the first bolt 130 is disengaged from the first foot 113 and does not prevent removal of the first foot 113 from the crossbar 120. In the first locking position, the first bolt 130 is engaged with the first foot 113. More particularly, a nose 132 of the first bolt 130 is received in the first notch 115 such that the first bolt 130 discourages or prevents removal of the first foot 113 from the crossbar 120 when the first bolt 130 is in the first locking position. As described herein, the trigger 150 is operable to selectively retain the first bolt 130 in the first unlocking position, and the lock device 200 is operable to selectively retain the first bolt 130 in the first locking position.

Like the first bolt 130, the second bolt 140 is movably mounted in the chamber 122 for movement between a second unlocking position (FIG. 2) and a second locking position (FIG. 3). In the illustrated embodiment, the second unlocking position is a distal position and the second locking position is a proximal position. In the second unlocking position, the second bolt 140 is disengaged from the second foot 114 and does not prevent removal of the second foot 114 from the crossbar 120. In the second locking position, the second bolt 140 is engaged with the second foot 114. More particularly, a nose 142 of the second bolt 140 is received in the second notch 116 such that the second bolt 140 discourages or prevents removal of the second foot 114 from the crossbar 120 when the second bolt 140 is in the second locking position. As described herein, the trigger 150 is operable to selectively retain the second bolt 140 in the second unlocking position, and the lock device 200 is operable to selectively retain the second bolt 140 in the second locking position.

The trigger 150 is movably mounted in the chamber 122 for movement between an engagement position (FIG. 2) and a disengagement position (FIG. 3), and may be biased toward the engagement position by a bias member 152. In the illustrated form, the bias member 152 is provided in the form of a compression spring. It is also contemplated that the bias member 152 may be provide in another form, such as one including an extension spring, a torsion spring, a leaf spring, an elastic component, and/or magnets.

When in the engagement position (FIG. 2), the trigger 150 selectively retains the bolts 130, 140 in the unlocking positions thereof to ensure that the shackle 110 can be engaged with the crossbar 120. More particularly, the trigger 150 in the engagement position abuts the spindle 230 of the lock device 200 such that the spindle 230 is inoperable to drive the bolts 130, 140 to the locking positions thereof. A portion of the trigger 150 is aligned with the first opening 123 such that insertion of the first foot 113 into the crossbar 120 drives the trigger 150 from the engagement position to the disengagement position against the force of the bias member 152.

When in the disengagement position (FIG. 3), the trigger 150 no longer prevents the spindle 230 from driving the bolts 130, 140 to the locking positions thereof. As such, when the lock device 200 is in its unlocked state, the slider 170 is operable to drive the spindle 230 from a spindle unlocking position to a spindle locking position to thereby drive the bolts 130, 140 to the locking positions thereof as described herein.

Figure 4:
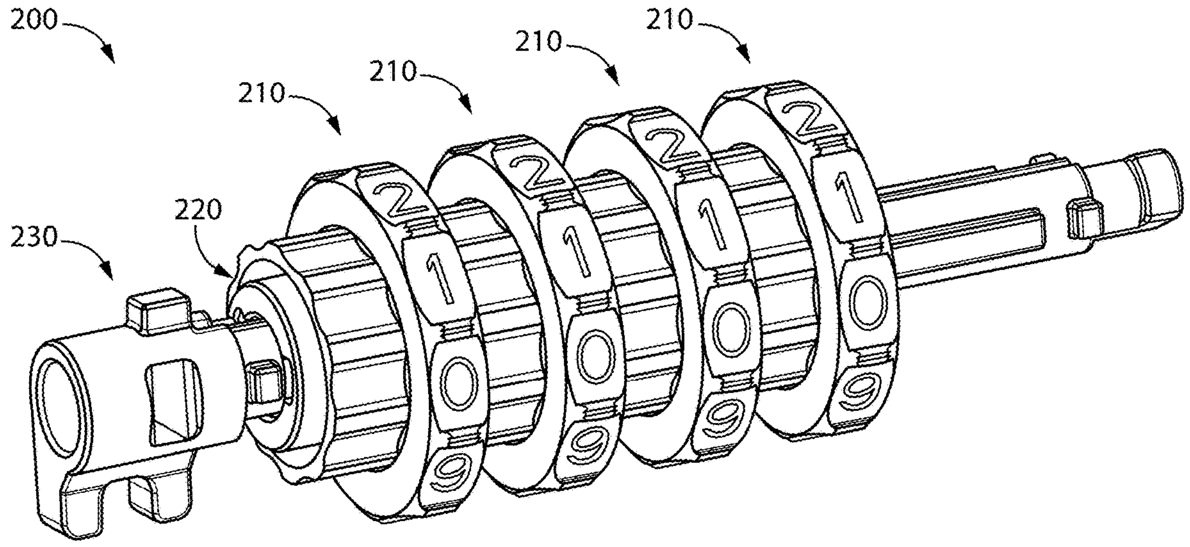
FIG. 4 is a perspective view of a lock device according to certain embodiments.
Figure 5:
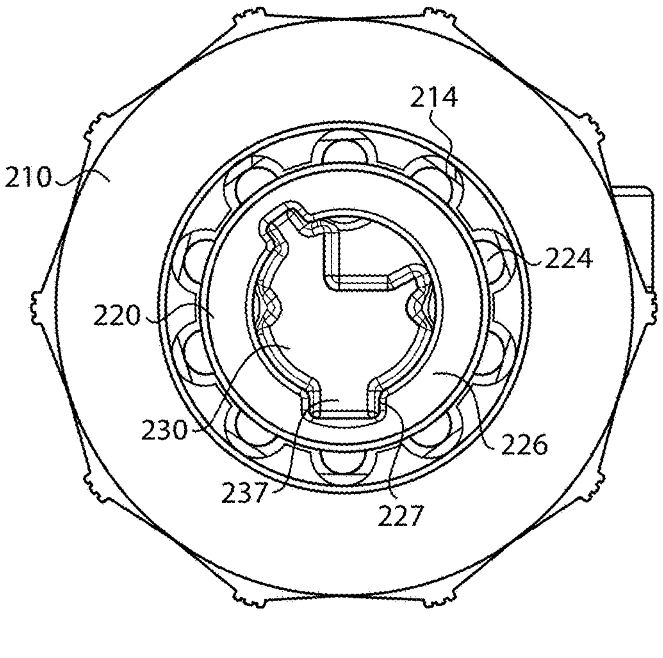
FIG. 5 is an end view of the lock device illustrated in FIG. 4.

With additional reference to FIGS. 4 and 5, the lock device 200 generally includes a plurality of outer dials 210, a plurality of inner dials 220, and a spindle 230 as noted above. The spindle 230 is mounted in the crossbar 120 for movement between a spindle unlocking position (FIG. 2) and a spindle locking position (FIG. 3). The inner dials 220 are mounted to the spindle 230, and the outer dials 210 are mounted to the inner dials 220. As described herein, the inner dials 220 retain the spindle 230 in its locking position when the lock device 200 is in its locked state, and do not prevent movement of the spindle 230 between its locking positon and its unlocking position when the lock device 200 is in its unlocked state.

Figure 6:
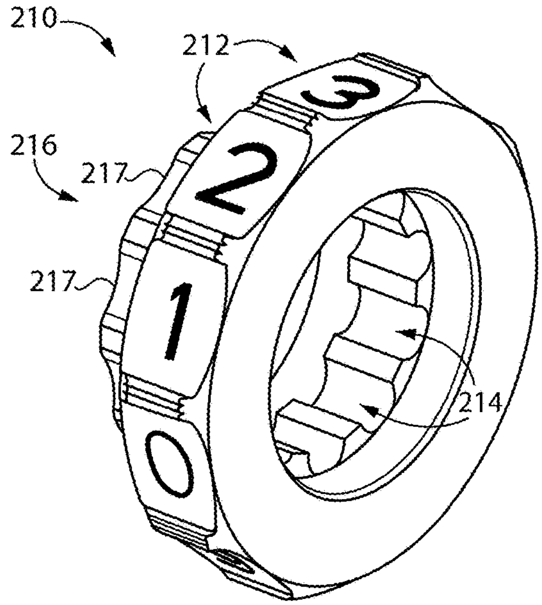
FIG. 6 is a perspective view of an outer dial according to certain embodiments.

With additional reference to FIG. 6, each outer dial 210 includes a plurality of indicia 212 on an outer surface thereof, and further includes a plurality of engagement features 214 on an inner surface thereof. As described herein, the engagement features 214 selectively engage mating engagement features 224 on the inner dials 220 to selectively rotationally couple each outer dial 210 with a corresponding inner dial 220. Formed on one side of the outer dial 210 is a first shoulder 216 including grooves 217 for engagement with a detent spring that selectively resists movement of the outer dial 210 from each of a plurality of positions to aid in proper positioning of the dial 210 and to provide tactile feedback to the user. In certain embodiments, a second shoulder may be formed on the opposite side of the dial 210, for example as described below with reference to FIGS. 14 and 15.

Figure 7:
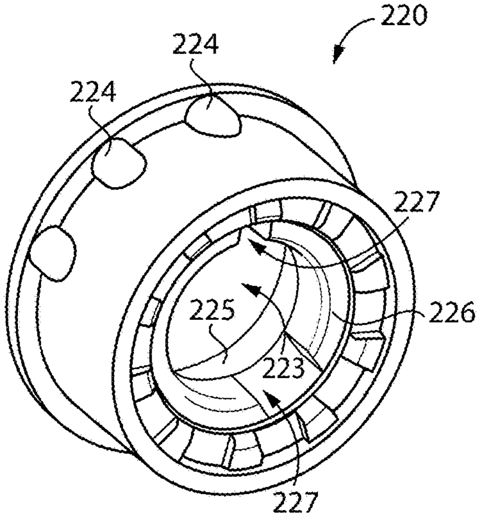
FIG. 7 is a perspective view of an inner dial according to certain embodiments.

With additional reference to FIG. 7, each inner dial 220 generally includes one or more mating engagement features 224 operable to engage the engagement features 214 of the corresponding outer dial 210. Each inner dial 220 also includes an aperture 223 through which the spindle 230 extends. The aperture 223 includes an annular recessed portion 225, and is defined in part by a partial circumferential boss 226 that is broken by one or more slots 227. As described herein, each inner dial 220 has an unlocking position in which each slot 227 is aligned with a corresponding spline 237 of the spindle 230, and a plurality of locking positions in which the boss 226 is positioned in a channel 238 defined in the spline 237.

Figure 8:
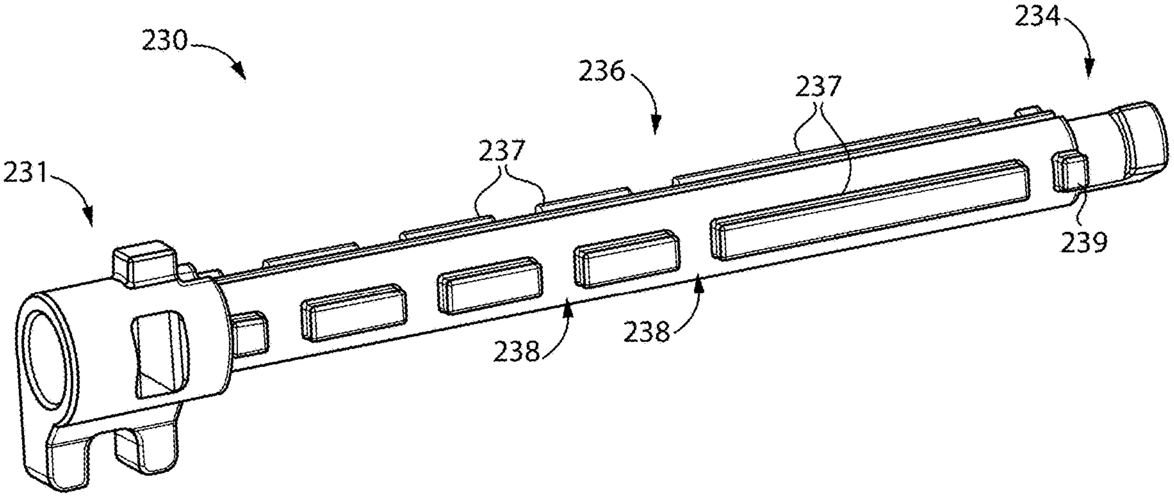
FIG. 8 is a perspective view of a spindle according to certain embodiments.

With additional reference to FIG. 8, the spindle 230 includes a proximal end portion 231, an opposite distal end portion 234, and a longitudinally-extending body portion 236 that extends between and connects the end portions 231, 234. The body portion 236 includes one or more longitudinal splines 237, each of which is broken by a plurality of channels 238 corresponding to the plurality of inner dials 220.

With the lock device 200 in its normal or operating mode, each outer dial 210 is rotationally coupled with a corresponding inner dial 220 by the mating engagement features 214, 224. As such, each outer dial 210 is operable to rotate the corresponding inner dial 220 to its unlocking position. When an inner dial 220 is in any of its plurality of locking positions, the boss 226 thereof is positioned in a corresponding channel 238, and engages the spline 237 to prevent longitudinal shifting of the spindle 230. When an inner dial 220 is in its unlocking position, each slot 227 is aligned with a corresponding spline 237 such that the inner dial 220 does not prevent longitudinal movement of the spindle 230. Thus, when each inner dial 220 is in the unlocking position thereof, the dials 220 do not prevent movement of the spindle 230 between its locking position and its unlocking position. Additionally, when all inner dials 220 are in the unlocking positions thereof, the reset mechanism 160 is operable to move the lock device 200 from the operating mode to a reset mode as described herein.

Figure 9:
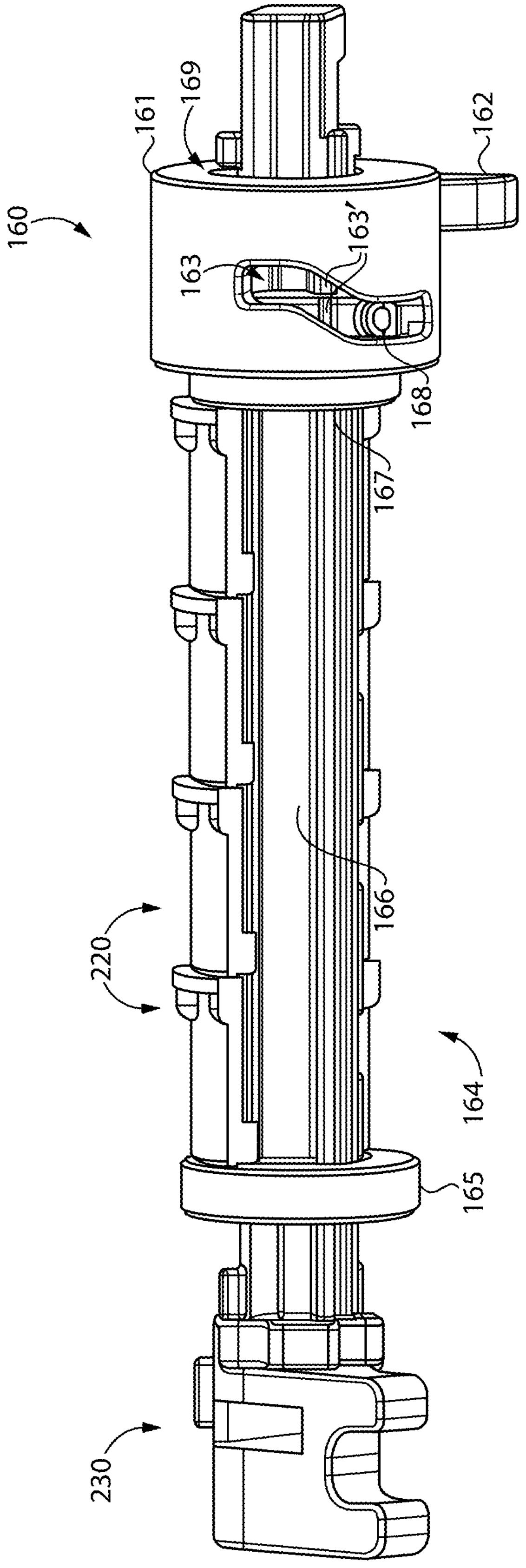
FIG. 9 is a perspective view of a reset mechanism according to certain embodiments.

With additional reference to FIG. 9, the reset mechanism 160 generally includes a rotatable reset knob 161 and a slidable reset bar 164 engaged with the reset knob 161 such that rotation of the reset knob 161 longitudinally drives the reset bar 164. The reset knob 161 generally includes a finger 162 that facilitates manual manipulation of the reset mechanism 160, and a cam slot 163 that includes a pair of helical ramps 163'. The reset bar 164 generally includes a proximal plate 165 positioned proximally of the inner dials 220, a distal plate 167 positioned distally of the inner dials 220, and a body portion 166 that extends between and connects the plates 165, 167. The distal plate 167 includes a cam projection 168 that projects into the cam slot 163.

When the lock device 200 is in its unlocked state, the reset knob 161 is rotatable from an operating position to a reset position. Such rotation of the reset knob 161 causes one of the ramps 163' to engage the cam projection 168 to thereby proximally drive the reset bar 164 from an operating position to a reset position. As the reset bar 164 moves to its reset position, the distal plate 167 drives the inner dials 220 proximally to disengaged positions in which the engagement features 214, 224 are disengaged with one another. As a result, the outer dials 210 are rotatable relative to the inner dials 220 such that the user is able to change the authorized combination.

Once the new authorized combination has been entered by rotating the outer dials 210 to the appropriate positions, the reset knob 161 may be returned to its normal operating position. Such rotation of the reset knob 161 causes the other of the ramps 163' to engage the cam projection 168 to thereby distally drive the reset bar 164 from the reset position to the operating position. As the reset bar 164 moves to its operating position, the proximal plate 165 drives the inner dials 220 distally to engaged positions in which the engagement features 214, 224 are engaged with one another. As a result, the outer dials 210 are now locked relative to the inner dials 220 such that rotation of any outer dial 210 causes a corresponding rotation of the engaged inner dial 220.

The slider 170 is mounted to the crossbar 120 for movement between a slider locking position and a slider unlocking position. The slider 170 is engaged with the spindle 230 such that movement of the slider 170 between its locking position and its unlocking position drives the spindle 230 between its locking position and its unlocking position.

Figure 10:
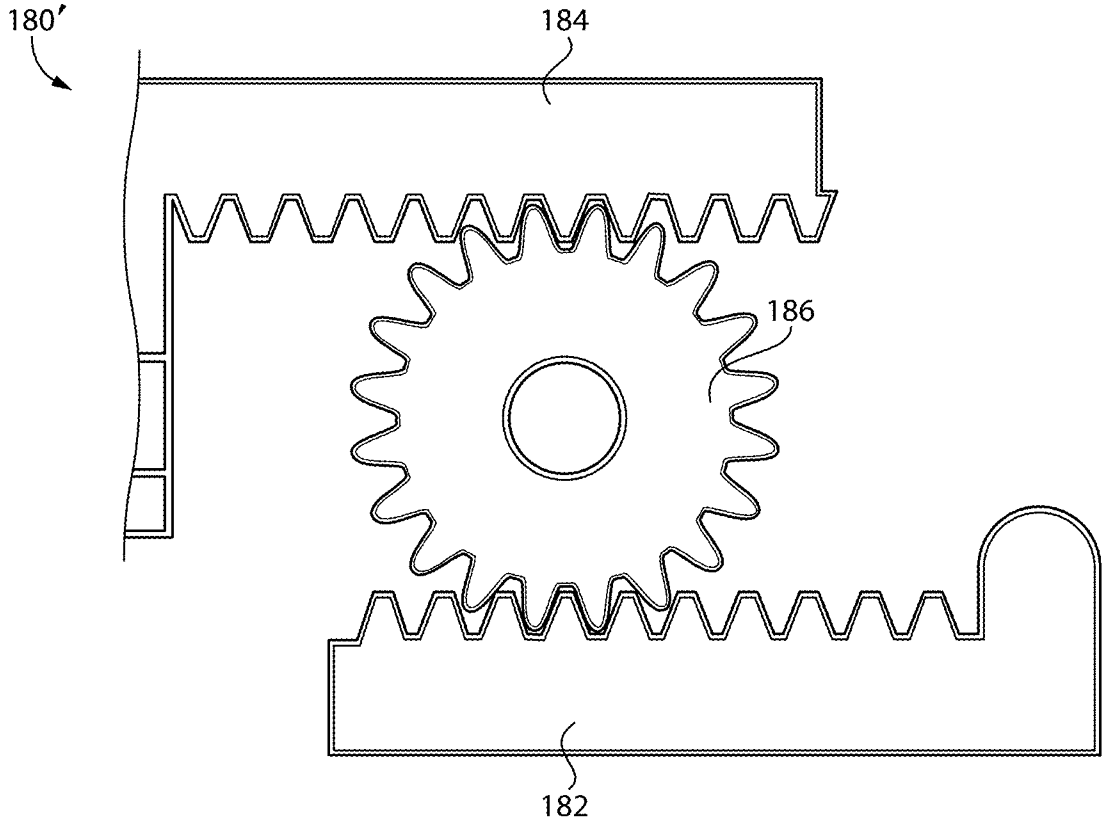
FIG. 10 is a plan view of a movement reverser according to certain embodiments.

The movement reverser 180 is engaged between the spindle 230 and the second bolt 140 and is configured to cause the second bolt 140 to move in the proximal direction in response to movement of the spindle 230 in the distal direction. In the illustrated form, the movement reverser 180 is provided in the form of a lever that translates movement of the spindle 230 in a first direction (e.g., one of the proximal direction or the distal direction) into movement of the second bolt 140 in the opposite direction (e.g., the other of the proximal direction or the distal direction). It is also contemplated that the movement reverser 180 may be provided in another form, such as a rack and pinion movement reverser 180' (FIG. 10).

During normal operation of the lock apparatus 100, the apparatus 100 may begin in a coupled-locked state in which the shackle 110 is coupled to the crossbar 120 and the lock device 200 is in its locked state. In this state, each bolt 130, 140 is engaged with the corresponding foot 113, 114, and the lock device 200 retains the bolts 130, 140 in the locking positions thereof. More particularly, the outer dials 210 are set to an incorrect combination such that the inner dials 220 retain the spindle 230 in its locking position, thereby preventing the slider 170 from moving the spindle 230 to cause unlocking movement of the bolts 130, 140.

Upon entry of the correct code via the outer dials 210, the lock apparatus 100 transitions to a coupled-unlocked state, in which the slots 227 of the inner dials 220 align with the splines 237 of the spindle 230 such that the inner dials 220 no longer prevent movement of the spindle 230 from its locking position to its unlocking position. As a result, the slider 170 is operable to proximally drive the spindle 230 from its locking position to its unlocking position, thereby causing retraction of the bolts 130, 140. In the illustrated form, the spindle 230 is engaged with the first bolt 130 such that proximal movement of the spindle 230 causes a corresponding proximal retraction of the first bolt 130, and is engaged with the second bolt 140 via the movement reverser 180 such that proximal movement of the spindle 230 causes a corresponding distal retraction of the second bolt 140.

From the coupled-unlocked state, the lock apparatus 100 may be transitioned to an open state by removing at least a portion of the shackle 110 from the crossbar 120. In the illustrated form, such decoupling involves removing each foot 113, 114 from the corresponding opening 123, 124. It is also contemplated that a portion of the shackle 110 may remain coupled to the crossbar 120 in the open state, for example in embodiments in which the shackle 110 is flexible and/or hingedly coupled to the crossbar 120. As the first foot 113 exits the crossbar, the bias member 152 drives the trigger 150 toward its engagement position.

When the lock apparatus 100 is in the open state, the trigger 150 retains the spindle 230 in the unlocking position thereof, thereby preventing the user from accidentally returning the lock device 200 to its locked state. From the open state, the lock apparatus 100 may be returned to its coupled-unlocked state by insertion of the feet 113, 114 into the corresponding openings 123, 124. During insertion of the first foot 113, a shoulder 119 of the first foot 113 depresses the trigger 150 to its disengagement position as described above. Thus, when the shackle 110 is fully seated, the slider 170 may be operated to return the lock apparatus 100 to its coupled-locked state. Such operation of the slider 170 involves driving the slider 170 distally, which distally drives the spindle 230 from its unlocking position to its locking position. In response to this movement of the spindle 230, the first bolt 130 is driven to its distal locking position, and the movement reverser 180 proximally drives the second bolt 140 to its proximal locking position.

With additional reference to FIG. 10, illustrated therein is another embodiment of the movement reverser 180. More particularly, FIG. 10 illustrates a rack and pinion movement reverser 180' according to certain embodiments. The illustrated movement reverser 180' generally includes a first rack 182, a second rack 184, and a pinion 186 engaged between the first rack 182 and the second rack 184. The first rack 182 is coupled with the spindle 230, the second rack 184 is coupled with the second bolt 140, and the pinion 186 causes the second rack 184 to move in a first direction (e.g., one of the proximal direction or the distal direction) in response to movement of the first rack 182 in the opposite second direction (e.g., the other of the proximal direction or the distal direction). Thus, the rack and pinion movement reverser 180' translates movement of the spindle 230 in a first direction (e.g., one of the proximal direction or the distal direction) into movement of the second bolt 140 in the opposite second direction (e.g., the other of the proximal direction or the distal direction).

Figure 11:
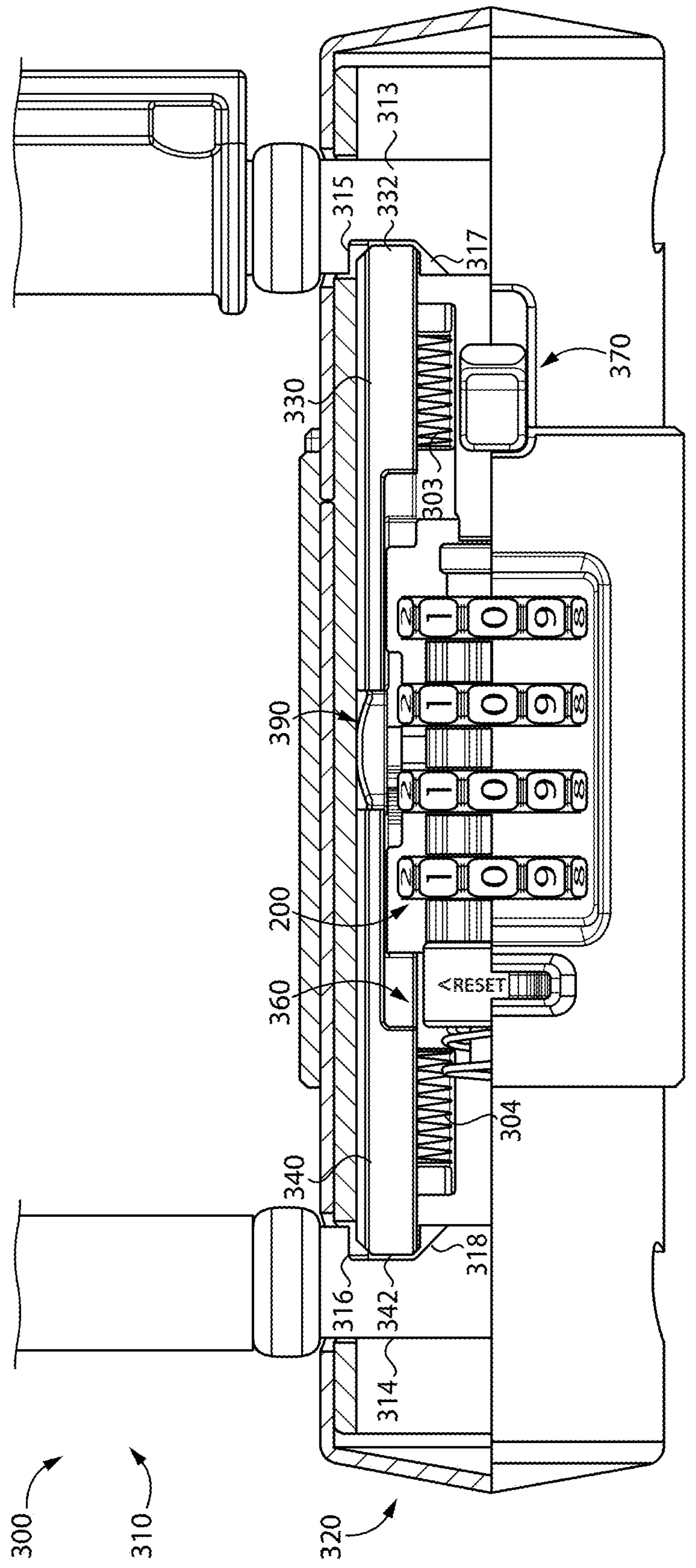
FIG. 11 is a partial cutaway view of a lock apparatus according to certain embodiments.

With additional reference to FIG. 11, illustrated therein is a portable lock apparatus 300 according to certain embodiments. The lock apparatus 300 is somewhat similar to the lock apparatus 100, and similar reference characters are used to indicate similar elements and features. For example, the lock apparatus 300 generally includes a shackle 310, a crossbar 320, a first bolt 330, a second bolt 340, a reset mechanism 360, and a slider 370, which respectively correspond to the shackle 110, the crossbar 120, the first bolt 130, the second bolt 140, the reset mechanism 160, and the slider 170 described above with reference to FIGS. 1-9. The lock apparatus 300 also includes the above-described lock device 200, which includes outer dials 210, inner dials 220, and a spindle 230 as noted above. In the interest of conciseness, the following description of the lock apparatus 300 primarily focuses on elements and features that are different from those described with reference to the lock apparatus 100.

In contrast to the unbiased bolts 130, 140 of the lock apparatus 100, each bolt 330, 340 of the illustrated lock apparatus 300 is biased outward toward its locking position. More particularly, a first bias member 303 distally biases the first bolt 330 toward its distal locking position, and a second bias member 304 proximally biases the second bolt 340 toward its proximal locking position. In the illustrated form, each bias member 303, 304 is provided in the form of a compression spring. It is also contemplated that one or both of the bias members 303, 304 may be provided in another form, such as one including a torsion spring, an extension spring, a leaf spring, an elastic member, and/or a magnet. As described herein, the lock apparatus 300 further includes a cam 390 that selectively retains the bolts 330, 340 in the locking positions thereof.

In the shackle 310, each notch 315, 316 is defined in part by a corresponding and respective ramp 317, 318. More particularly, the first notch 315 is defined in part by a first ramp 317, and the second notch 316 is defined in part by a second ramp 318. When the shackle 310 is engaged with the crossbar 320 and the bolts 330, 340 are in the extended positions thereof, each notch 315, 316 receives the nose 332, 342 of the corresponding bolt 330, 340. When a user attempts to withdraw the feet 313, 314 from the crossbar 320, each ramp 317, 318 urges the corresponding bolt 330, 340 toward the inward unlocking position thereof against the force of the corresponding bias member 303, 304. As described herein, the cam 390 selectively prevents such inward unlocking movement of the bolts 330, 340 to selectively retain the lock apparatus 300 in its coupled-locked state.

Figure 13:
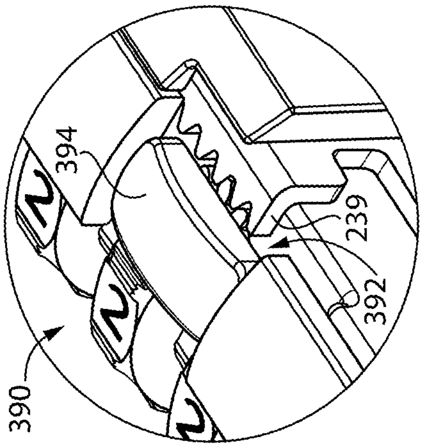
FIG. 13 is a perspective view of a cam according to certain embodiments.
Figure 12:
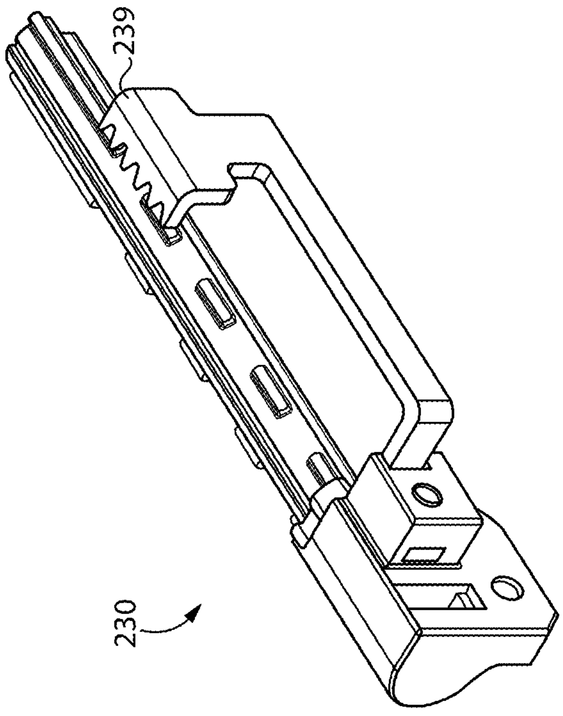
FIG. 12 is a perspective view of a spindle according to certain embodiments.

With additional reference to FIGS. 12 and 13, in the illustrated form, the spindle 230 has a rack 239 mounted thereon, and the cam 390 includes a pinion 392 engaged with the rack 239 such that longitudinal movement of the spindle 230 causes a corresponding rotation of the cam 390. The cam 390 also includes a head portion 394 that has a major dimension and a minor dimension smaller than the major dimension. The cam 390 is rotatable between a cam locking position, in which the major dimension of the head portion 394 extends longitudinally, and a cam unlocking position, in which the minor dimension of the head portion 394 extends longitudinally. When in the cam locking positon, the cam 390 prevents inward movement of the bolts 330, 340 to the unlocking positions thereof, thereby retaining each bolt 330, 340 in its outward locking position. When the cam 390 is in the cam unlocking position, each bolt 330, 340 is capable of moving inward to its unlocking position such that the shackle 110 can be withdrawn from the crossbar 120. In the illustrated form, the slider 370 is coupled with the spindle 230 such that the slider 370 is operable to drive the cam 390 between its locking position and its unlocking position when the correct code is entered to the lock device 200.

Figure 14:
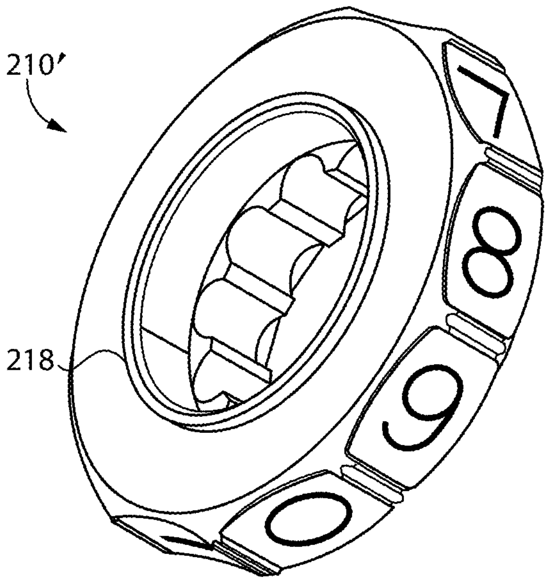
FIG. 14 is a perspective view of an outer dial according to certain embodiments.
Figure 15:
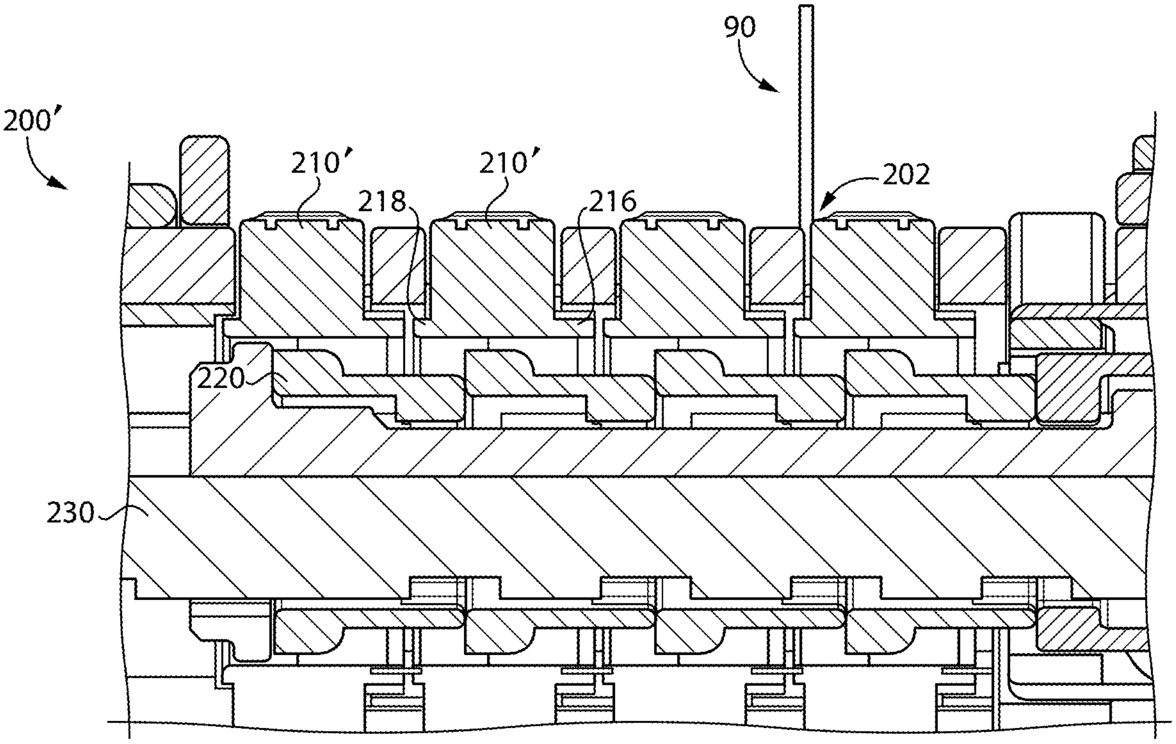
FIG. 15 is a cross-sectional view of a lock device according to certain embodiments.

With additional reference to FIGS. 14 and 15, illustrated therein is a lock device 200' according to certain embodiments. The lock device 200' is substantially similar to the lock device 200, and includes the above-described inner dials 220 and spindle 230. The lock device 200 further includes tamper-resistant outer dials 210' that are substantially similar to the above-described outer dials 210, but further include a second shoulder 218 opposite the first shoulder 216. One common method of decoding a combination lock device is to insert a thin tampering tool 90 in a space 202 adjacent an outer dial 210 in an attempt to determine the location of the slots 227 of the inner dials 220. When the location of a slot 227 is known, the corresponding outer dial 210 can be rotated to align the slot 227 with the spline 237, thereby placing the inner dial 220 in its unlocking position. In the lock device 200', however, insertion of such a tampering tool 90 is prevented by the shoulders 216, 218, thereby increasing the security of the lock device 200'.

Figure 17:
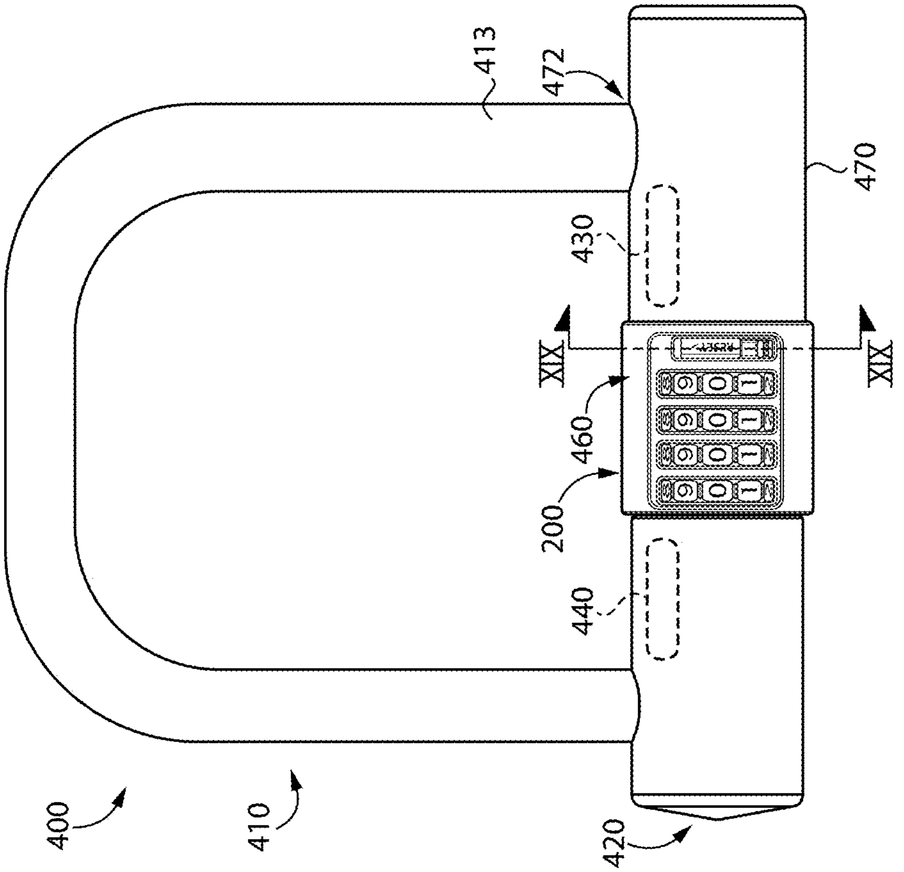
FIG. 17 is a plan view of the lock apparatus illustrated in FIG. 15 in a coupled-unlocked state.
Figure 16:
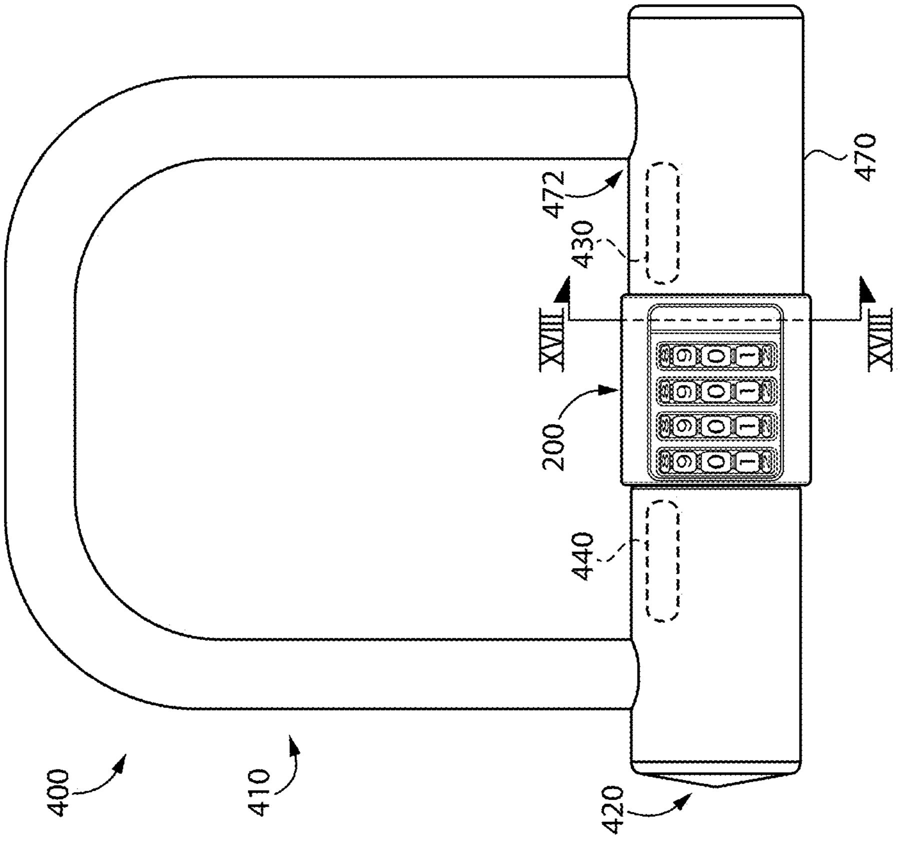
FIG. 16 is a plan view of a lock apparatus according to certain embodiments in a coupled-locked state.

With additional reference to FIGS. 16 and 17, illustrated therein is a portable lock apparatus 400 according to certain embodiments. The lock apparatus 400 generally includes a shackle 410, a crossbar 420, and at least one bolt 430 operable to engage the shackle 410 to selectively retain the lock apparatus 400 in a closed state. In the illustrated form, the lock apparatus 400 further includes a second bolt 440. In certain embodiments, the shackle 410 and/or the internal components of the crossbar 420 may be substantially similar to those described above with reference to the lock apparatus 100. In certain embodiments, the shackle 410 and/or the internal components of the crossbar 420 may be substantially similar to those described above with reference to the lock apparatus 300. In certain embodiments, the shackle 410 and/or the internal components of the crossbar 420 may be provided in another form.

The lock apparatus 400 also includes the lock device 200 and a reset mechanism 460 corresponding to the above-described reset mechanism 160. The lock apparatus 400 further includes a cover 470 that is coupled with the spindle 230 of the lock device 200 and is operable to perform the functions described above with reference to the sliders 170, 270 (e.g., transition the lock apparatus 400 between a coupled-locked state and a coupled-unlocked state when the lock device 200 is in its unlocked state). The cover 470 is also configured to cover the reset mechanism 460 when the cover 470 is in its locking position (FIG. 16), and to expose the reset mechanism 460 when the cover 470 is in its unlocking position (FIG. 17). The cover 470 includes an elongated aperture 472 that accommodates the first foot 413 as the cover 470 slides between its locking position and its unlocking position.

The reset mechanism 460 is positioned such that the finger 462 of the reset knob 461 is covered when the cover 470 is in its locking position (FIG. 16), and is exposed when the cover 470 is in its unlocking position (FIG. 17). As a result, the user cannot access the reset knob 461 without entering the proper code into the lock device 200 and moving the cover 470 to its unlocking position.

Figure 18:
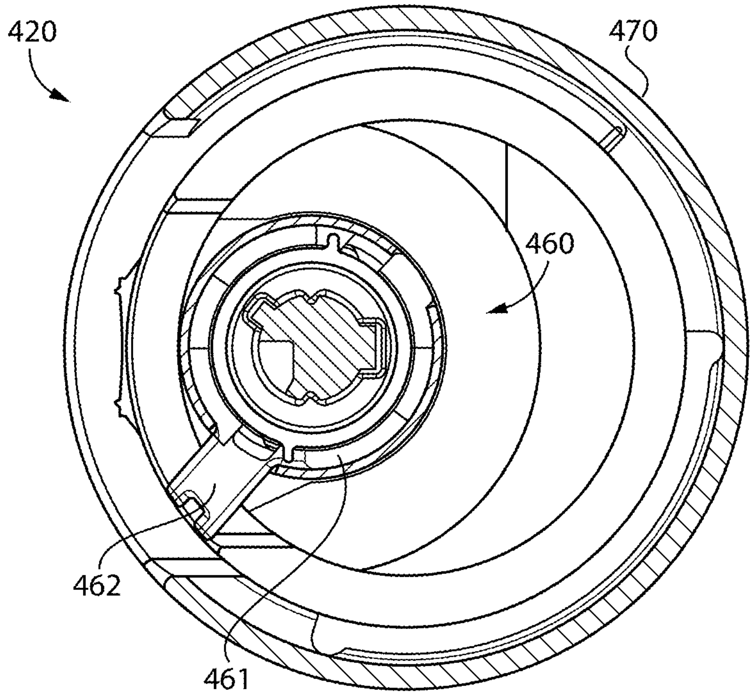
FIG. 18 is a cross-sectional view taken along the line XVIII-XVIII of FIG. 16.
Figure 19:
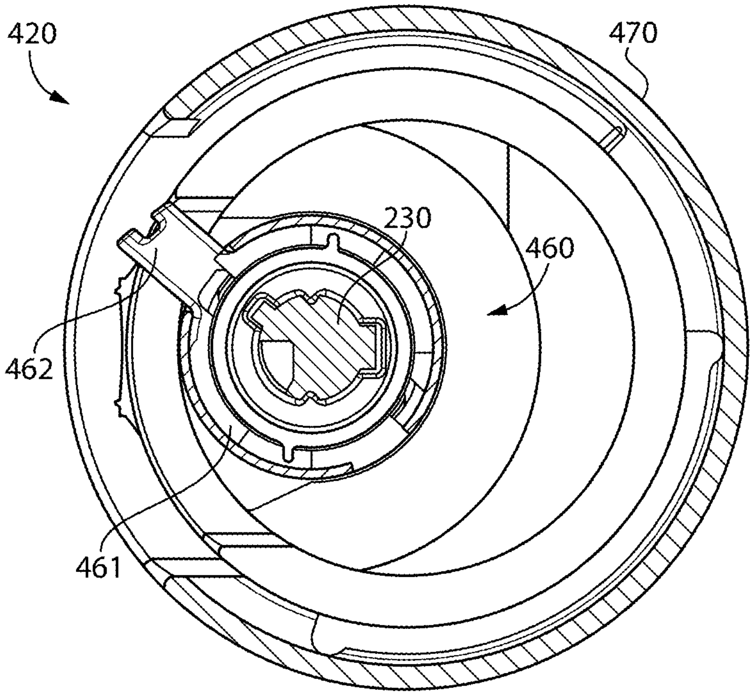
FIG. 19 is a cross-sectional view taken along the line XIX-XIX of FIG. 17.

With additional reference to FIGS. 18 and 19, illustrated therein is the crossbar 420 with the reset knob 461 in its normal or operating position (FIG. 18), and with the reset knob 461 in its reset position (FIG. 19). When the reset knob 461 is in the normal position, the finger 462 does not prevent movement of the cover 470 between its locking position and its unlocking position. When the reset knob 461 is in the reset position, however, the finger 462 projects beyond the outer surface of the body of the crossbar 420 and into the path along which the cover 470 travels from the unlocking position to the locking position. As a result, the reset knob 461 in the reset position retains the cover 470 in the unlocking position, thereby discouraging the user from accidentally returning the lock device 200 to its locked state before completion of the reset operation.

Certain embodiments of the present application relate to a portable lock apparatus, comprising: a shackle including a foot; a crossbar operable to receive the foot; a combination lock mounted to the crossbar, the combination lock having: an unlocked state when an authorized code is input to the combination lock; a locked state when the authorized code is not input to the combination lock; an operating mode in which the authorized code is fixed; and a reset mode in which the authorized code is changeable; a bolt operable to engage the foot, wherein the bolt prevents removal of the foot from the crossbar when the combination lock is in the locked state; a reset mechanism operable to transition the combination lock between the operating mode and the reset mode when the combination lock is in the unlocked state; and a cover movably mounted to the crossbar for movement between a covering position in which the cover covers the reset mechanism and an exposing position in which the cover exposes the reset mechanism; wherein the cover is retained in the covering position when the combination lock is in the locked state; and wherein the cover is movable between the covering position and the exposing position when the combination lock is in the unlocked state.

In certain embodiments, the bolt prevents removal of the foot from the crossbar when the cover is in the covering position; and wherein the foot is removable from the crossbar when the cover is in the exposing position.

In certain embodiments, the shackle is rigid.

In certain embodiments, the reset mechanism is movable between a first position corresponding to the operating mode and a second position corresponding to the reset mode; wherein the reset mechanism comprises a finger that facilitates manipulation of the reset mechanism for movement between the first position and the second position; and wherein the finger is received within the crossbar when the reset mechanism is in the first position.

In certain embodiments, with the reset mechanism in the second position, the finger retains the cover in the exposing position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A portable lock apparatus, comprising:

a shackle comprising a foot and an additional foot; and a crossbar operable to receive the foot, the crossbar comprising:

a bolt mounted for movement between a locking position and an unlocking position;

an additional bolt configured to selectively engage the additional foot; and a trigger mounted for movement between an engagement position and a disengagement position;

wherein the trigger in the engagement position retains the bolt in the unlocking position;

wherein the trigger in the disengagement position permits movement of the bolt toward the locking position; and wherein the trigger is configured to move from the engagement position to the disengagement position when the foot is received in the crossbar.

2. The portable lock apparatus of claim 1, wherein the bolt is operable to engage the foot when in the locking position, and to disengage from the foot when in the unlocking position.

3. The portable lock apparatus of claim 1, wherein the additional bolt is configured to move between an additional locking position and an additional unlocking position in response to movement of the bolt between the locking position and the unlocking position.

4. The portable lock apparatus of claim 1, further comprising a movement reverser engaged between the bolt and the additional bolt, wherein the movement reverser is configured to drive the additional bolt in a first direction in response to movement of the bolt in a second direction opposite the first direction.

5. The portable lock apparatus of claim 4, wherein the first bolt comprises a first rack;

wherein the additional bolt comprises a second rack; and wherein the movement reverser comprises a pinion engaged with each of the first rack and the second rack.

6. The portable lock apparatus of claim 1, further comprising a lock device operable to selectively prevent movement of the bolt from the locking position to the unlocking position.

7. The portable lock apparatus of claim 6, further comprising a slider selectively operable to move the bolt from the locking position to the unlocking position;

wherein the slider is operable to move the bolt from the locking position to the unlocking position when the lock device is in an unlocked state; and wherein the slider is inoperable to move the bolt from the locking position to the unlocking position when the lock device is in a locked state.

8. A portable lock apparatus, comprising:

a shackle comprising a foot;

a crossbar operable to receive the foot, the crossbar comprising a bolt mounted for movement between a locking position and an unlocking position; and a combination lock operable to selectively prevent movement of the bolt from the locking position to the unlocking position, the combination lock comprising:

a plurality of inner dials mounted for rotation about a longitudinal axis; and a plurality of outer dials mounted for rotation about the longitudinal axis and at least selectively engaged with the plurality of inner dials;

wherein each outer dial comprises:

a plurality of indicia on an outer surface thereof;

a first shoulder formed on a first side of the outer dial, the first shoulder projecting in a first longitudinal direction and configured to inhibit insertion of a tampering tool toward the plurality of inner dials; and a second shoulder formed on an opposite second side of the outer dial, the second shoulder projecting in a second longitudinal direction and configured to inhibit insertion of the tampering tool toward the plurality of inner dials;

wherein the combination lock is mounted to the crossbar and is operable to selectively prevent removal of the foot from the crossbar; and wherein a portion of the crossbar covers the first shoulder of one of the outer dials and the second shoulder of an adjacent one of the outer dials.

9. The portable lock apparatus of claim 8, wherein a distal end face of the first shoulder of one of the outer dials faces a proximal end face of the second shoulder of an adjacent one of the outer dials.

10. The portable lock apparatus of claim 8, wherein the first shoulder of one of the outer dials is longitudinally spaced from the second shoulder of an adjacent one of the outer dials.

11. The portable lock apparatus of claim 10, wherein the first shoulder of the one of the outer dials is longitudinally aligned with the second shoulder of the adjacent one of the outer dials, but does not longitudinally overlap the second shoulder of the adjacent one of the outer dials.

12. The portable lock apparatus of claim 8, wherein the crossbar further comprises a trigger mounted for movement between an engagement position and a disengagement position;

wherein the trigger in the engagement position retains the bolt in the unlocking position;

wherein the trigger in the disengagement position permits movement of the bolt toward the locking position; and wherein the trigger is configured to move from the engagement position to the disengagement position when the foot is received in the crossbar.

13. The portable lock apparatus of claim 8, wherein each of the first shoulder and the second shoulder circumferentially surrounds the longitudinal axis.

14. A portable lock apparatus, comprising:

a shackle including a foot;

a crossbar operable to receive the foot;

a bolt operable to engage the foot when the foot is received in the crossbar and the bolt is in an extended position, wherein the foot is operable to urge the bolt toward a retracted position in response to attempted removal of the foot from the crossbar;

a cam operable to selectively retain the bolt in the extended position, wherein the cam is mounted for rotation between a blocking position and a releasing position;

a slider operable to rotate the cam between the blocking position and the releasing position; and a lock mechanism operable to selectively prevent the slider from rotating the cam.

15. The portable lock apparatus of claim 14, further comprising a ramp configured to urge the bolt toward the retracted position in response to attempted removal of the foot from the crossbar.

16. The portable lock apparatus of claim 15, wherein the foot comprises the ramp.

17. The portable lock apparatus of claim 14, further comprising an additional bolt operable to engage an additional foot of the shackle when the additional foot is received in the crossbar and the additional bolt is in an additional extended position; and wherein the additional foot is operable to urge the additional bolt toward an additional retracted position in response to attempted removal of the additional foot from the crossbar.

18. The portable lock apparatus of claim 14, wherein the bolt is biased toward the extended position.

19. The portable lock apparatus of claim 14, wherein the cam comprises a pinion; and wherein the slider is coupled to a rack engaged with the pinion.

* * * * *